United States Patent
Yun et al.

(10) Patent No.: US 7,279,251 B1
(45) Date of Patent: Oct. 9, 2007

(54) LITHIUM SECONDARY BATTERY COMPRISING A SUPER FINE FIBROUS POLYMER SEPARATOR FILM AND ITS FABRICATION METHOD

(75) Inventors: Kyung Suk Yun, Seoul (KR); Byung Won Cho, Seoul (KR); Seong Mu Jo, Seoul (KR); Wha Seop Lee, Seoul (KR); Won Il Cho, Seoul (KR); Kun You Park, Seoul (KR); Hyung Sun Kim, Seoul (KR); Un Seok Kim, Seoul (KR); Seok Ku Ko, Seoul (KR); Suk Won Chun, Seoul (KR); Sung Won Choi, Kyonggi-Do (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 10/276,880

(22) PCT Filed: May 19, 2000

(86) PCT No.: PCT/KR00/00500

§ 371 (c)(1),
(2), (4) Date: Jul. 11, 2003

(87) PCT Pub. No.: WO01/89022

PCT Pub. Date: Nov. 22, 2001

(51) Int. Cl.
*H01M 2/16* (2006.01)

(52) U.S. Cl. ............ 429/247; 429/248; 429/249; 429/129

(58) Field of Classification Search ........... 429/129, 429/247, 248, 249
See application file for complete search history.

(56) References Cited

U.S. PATENT DOCUMENTS 3,925,525 A 12/1975 LaNieve (Continued)

FOREIGN PATENT DOCUMENTS

EP 0 862 232 9/1998

(Continued)

OTHER PUBLICATIONS

Bohnke et al. "Fast ion transport in new lithium electrolytes gelled with PMMA.2. Influence of lithium salt concentration" Solid State Ionics 66 (1993), pp. 105-112.

(Continued)

*Primary Examiner*—Laura Weiner
(74) *Attorney, Agent, or Firm*—Darby & Darby (57) ABSTRACT

The present invention provides a lithium secondary battery and its fabrication method. More particularly, the present invention provides a lithium secondary battery comprising a super fine fibrous porous polymer separator film and its fabrication method, wherein the porous polymer separator film is fabricated by the following process: a) melting at least one polymer or dissolving at least one polymer with organic solvents to obtain at least one polymeric melt or at least one polymeric solution; b) adding the obtained polymeric melt or polymeric solution to barrels of an electrospinning machine; and c) discharging the polymeric melt or polymeric solution onto a substrate using a nozzle to form a porous separator film. The lithium secondary battery of the present invention has the advantages of better adhesion with electrodes, good mechanical strength, better performance at low and high temperatures, better compatibility with organic electrolyte solution of a lithium secondary battery.

11 Claims, 5 Drawing Sheets

U.S. PATENT DOCUMENTS

| | | | |
|---|---|---|---|
| 4,007,058 A | 2/1977 | Nelson et al. | |
| 4,127,706 A | 11/1978 | Martin et al. | |
| 5,219,679 A | 6/1993 | Abraham et al. | |
| 5,240,790 A | 8/1993 | Chua et al. | |
| 5,296,185 A | 3/1994 | Chau et al. | |
| 5,460,904 A | 10/1995 | Gozdz et al. | |
| 5,525,443 A | 6/1996 | Okuno et al. | |
| 6,051,175 A | 4/2000 | Kurihara et al. | |
| 6,180,281 B1 * | 1/2001 | Schneider et al. | 429/129 |

FOREIGN PATENT DOCUMENTS

| | | |
|---|---|---|
| EP | 0 892 453 | 1/1999 |
| EP | 0 921 529 | 6/1999 |
| JP | 60-252716 | 12/1985 |
| JP | 08-250100 | 9/1996 |
| JP | 09-022724 | 1/1997 |
| JP | 09-259857 | 10/1997 |
| JP | 10-233233 | 9/1998 |
| JP | 2000-082498 | 3/2000 |

OTHER PUBLICATIONS

Alamgir et al. "li Ion Conductive Electrolytes Based on Poly (vinyl chloride)" J. Electrochem. Soc., vol. 140, No. 6, Jun. 1993, pp. L96-L97.

* cited by examiner

LITHIUM SECONDARY BATTERY COMPRISING A SUPER FINE FIBROUS POLYMER SEPARATOR FILM AND ITS FABRICATION METHOD

TECHNICAL FIELD

The present invention relates to a lithium secondary battery comprising a super fine fibrous polymer separator film, and to a fabrication method thereof.

BACKGROUND ART

Recently, concomitant with miniaturization and lightweight trends in electronic appliances, research into energy sources having high density and high energy has been performed intensively. A lithium secondary battery has been proposed as one energy source in the aspect that the higher integration of energy is possible because the molecular weight of lithium used in a lithium secondary battery is very low, but its density is relatively high.

In the earlier developed lithium secondary battery, an anode was fabricated with metallic lithium or lithium alloy. However, a cycle characteristic of such secondary battery using metallic lithium or lithium alloy is reduced significantly due to dendrites generated on an anode in the course of repeated charging and discharging of the battery.

A lithium ion battery was presented in order to solve the problem of dendrite generation. The lithium ion battery developed by SONY Company in Japan and widely used all over the world comprises an anode active material, a cathode active material, an organic electrolyte and a separator film.

The separator film functions to prevent an internal short-circuiting of the lithium ion battery caused by contacting of a cathode and an anode, and to permeate ions. Separator films generally used at the present time are polyethylene (hereinafter referred to as "PE") or polypropylene (hereinafter referred to as "PP") separator films. However, the lithium ion battery using the PE or PP separator film has problems such as instability of a battery, intricacy of its fabrication process, restriction on battery shape and limitation of high capacity. There have been attempts to solve the above-mentioned problems, but there is no clear result until now.

On the contrary, a lithium polymer battery uses a polymer electrolyte having two functions, as a separator film and as an electrolyte at the same time, and it is now being viewed with keen interest as a battery being able to solve all of the problems. The lithium polymer battery has an advantage in view of productivity because the electrodes and a polymer electrolyte can be laminated in a flat-plate shape and its fabrication process is similar to a fabrication process of a polymer film.

A conventional polymer electrolyte is mainly prepared with polyethylene oxide (hereinafter referred to as "PEO"), but its ionic conductivity is merely $10^{-8}$ S/cm at room temperature, and accordingly it can not be used commonly.

Recently, a gel or hybrid type polymer electrolyte having an ionic conductivity above $10^{-3}$ S/cm at room temperature has been developed.

K. M. Abraham et al. and D. L. Chua et al. disclose a polymer electrolyte of a gel type polyacrylonitrile (hereinafter referred to as "PAN") group in U.S. Pat. No. 5,219,679 and in U.S. Pat. No. 5,240,790 respectively. The gel type PAN group polymer electrolyte is prepared by injecting a solvent compound (hereinafter referred to as an "organic electrolyte solution") prepared with a lithium salt and organic solvents, such as ethylene carbonate and propylene carbonate, etc. into a polymer matrix. It has the advantages that the contact resistance is small in charging/discharging of a battery and desorption of the active materials rarely takes place because the adhesive force of the polymer electrolyte is good, and accordingly adhesion between a composite electrode and a metal substrate is well developed. However, such a polymer electrolyte has a problem in that its mechanical stability, namely its strength, is low because the electrolyte is a little bit soft. Especially, such deficiency in strength may cause many problems in the fabrication of an electrode and battery.

A. S. Gozdz et al. discloses a polymer electrolyte of hybrid type polyvinylidenedifluoride (hereinafter referred to as "PVdF") group in U.S. Pat. No. 5,460,904. The polymer electrolyte of the hybrid type PVdF group is prepared by fabricating a polymer matrix having a porosity not greater than submicron, and then injecting an organic electrolyte solution into the small pores in the polymer matrix. It has the advantages that its compatibility with the organic electrolyte solution is good, the organic electrolyte solution injected into the small pores is not leaked so as to be safe in use and the polymer matrix can be prepared in the atmosphere because the organic electrolyte solution is injected afterwards. However, it has the disadvantages that the fabrication process is intricate because when the polymer electrolyte is prepared, an extraction process of a plasticizer and an impregnation process of the organic electrolyte solution are required. In addition, it has a critical disadvantage in that a process forming a thin layer by heating and an extraction process are required in fabrication of electrodes and batteries because although the mechanical strength of the PVdF group electrolyte is good, its adhesive force is poor.

Recently, a polymer electrolyte of a polymethylmethacrylate (hereinafter referred to as "PMMA") group was presented in *Solid State Ionics*, 66, 97, 105 (1993) by O. Bohnke and G. Frand, et al. The PMMA polymer electrolyte has the advantages that it has an ionic conductivity of $10^{-3}$ S/cm at room temperature and its adhesive force and compatibility with an organic electrolyte solution are good. However, its mechanical strength is very poor, and accordingly it is unfeasible for the lithium polymer battery.

In addition, a polymer electrolyte of a polyvinylchloride (hereinafter referred to as "PVC") group, which has good mechanical strength and has an ionic conductivity of $10^{-3}$ S/cm at room temperature, was presented in *J. electrochem. Soc.*, 140, L96 (1993) by M. Alamgir and K. M. Abraham. However, it has problems in that a low-temperature characteristic is poor and a contact resistance is high.

SUMMARY OF THE INVENTION

It is an object of the present invention to provide a lithium secondary battery having advantages of both a lithium ion battery and a lithium polymer battery.

It is another object of the present invention to provide a lithium secondary battery having good adhesion with electrodes, mechanical strength, low- and high-temperature characteristics, and compatibility with an organic electrolyte solution for a lithium secondary battery, etc.

The above-mentioned objects and other objects can be achieved by providing a porous polymer separator film constructed in a super fine fibrous form.

DETAILED DESCRIPTION OF THE INVENTION

The present invention relates to a lithium secondary battery comprising a super fine fibrous porous polymer separator film, and to a fabrication method thereof. In particular, the present invention relates to a lithium secondary battery comprising a cathode active material, an anode active material, an organic electrolyte solution dissolving a lithium salt and a super fine fibrous porous polymer separator film.

Figure 1:
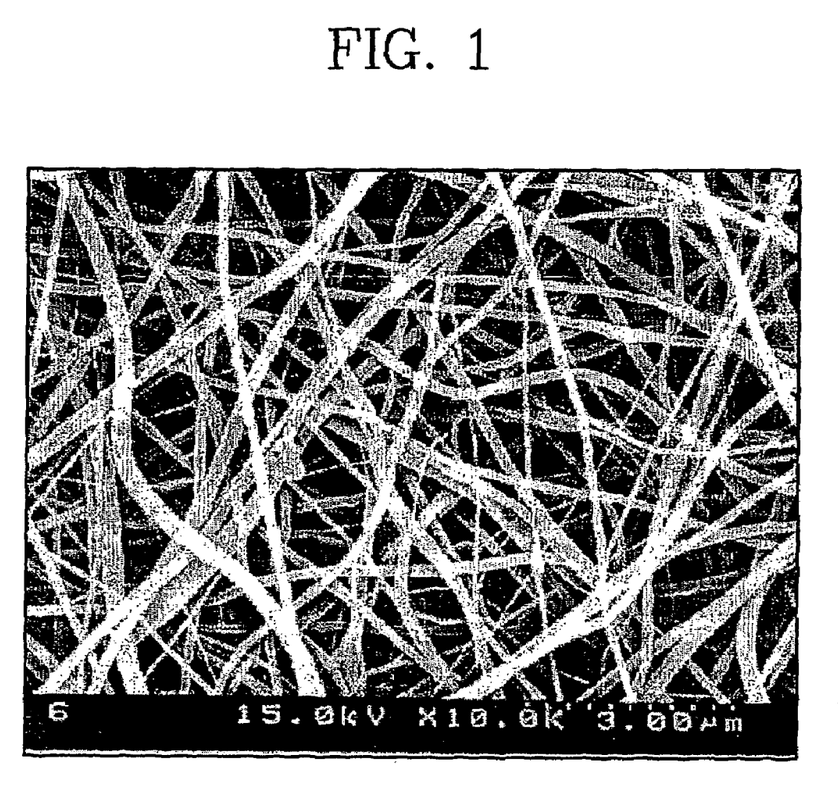
FIG. 1 is a photograph of the porous polymer separator film of the present invention taken with a transmission electronic microscope.

As depicted in FIG. 1, a porous polymer separator film constructed with super fine polymer fibers has a structure in which super fine fibers with the diameter of 1~3000 nm are grouped disorderly and three-dimensionally. Due to the small diameter of the fibers, the ratio of surface area to volume and the void ratio are very high compared to those of a conventional separator film. Accordingly, due to the high void ratio of the porous polymer separator film of the present invention, the amount of electrolyte impregnated is large and the ionic conductivity is increased, and due to the large surface area, the contact area with the electrolyte can be increased and the leakage of electrolyte can be minimized in spite of the high void ratio. Furthermore, if a porous polymer separator film is fabricated by electrospinning, it has an advantage in that it can be prepared not in the form of mere pieces of fibers but in the form of a film directly.

The polymers forming the porous polymer separator film are not limited, on condition that they can be formed into super fine fibers; in more particularity that they can be formed into super fine fibers by electrospinning. Examples include polyethylene, polypropylene, cellulose, cellulose acetate, cellulose acetate butylate, celluloseacetate propionate, polyvinylpyrrolidone-vinylacetate, poly[bis(2-(2-methoxyethoxyethoxy))phosphagene], poly-ethyleneimide, polyethyleneoxide, polyethylenesuccinate, polyethylenesulfide, poly(oxymethylene-oligo-oxyethylene), polypropyleneoxide, polyvinylacetate, polyacrylonitrile, poly(acrylonitrile-co-methylacrylate), polymethylmethacrylate, poly(methylmethacrylate-co-ethylacrylate), polyvinylchloride, poly(vinylidene-chloride-co-acrylonitrile), polyvinylidenedifluoride, poly(vinylidenefluoride-co-hexafluoropropylene) or mixtures thereof.

Although there is no specific limitation on the thickness of the porous polymer separator film, it is preferable to have a thickness of 1 μm-100 μm. It is more preferable to have a thickness of 5 μm-70 μm and most preferable to have a thickness of 10 μm-50 μm. Furthermore, the diameter of the fibrous polymer forming the polymer separator film is preferable to be adjusted to a range of 1~3000 nm, more preferable to a range of 10 nm~1000 nm, and most preferable to a range of 50 nm~500 nm.

Lithium salts used in the lithium secondary battery of the present invention are conventional lithium salts, such as $LiPF_6$, $LiClO_4$, $LiAsF_6$, $LiBF_4$ or $LiCF_3SO_3$, and it is more preferable to use $LiPF_6$.

Examples of the organic solvent used in the organic electrolyte solution can include ethylene carbonate, propylene carbonate, diethyl carbonate, dimethyl carbonate, ethylmethyl carbonate or mixtures thereof. In order to improve the low-temperature characteristic of the battery, methyl acetate, methyl propionate, ethyl acetate, ethyl propionate, butylenecarbonate, γ-butyrolactone, 1,2-dimethoxyethane, 1,2-dimethoxyethane, dimethyl-acetamide, tetrahydrofuran or mixtures thereof can be further added to the organic solvent.

The porous polymer separator film of the present invention can further include a filling agent in order to improve porosity and mechanical strength. Examples of a filling agent include substances, such as $TiO_2$, $BaTiO_3$, $Li_2O$, LiF, LiOH, $Li_3N$, BaO, $Na_2O$, MgO, $Li_2CO_3$, $LiAlO_2$, $SiO_2$, $Al_2O_3$, PTFE or mixtures thereof. Generally, the content of the filling agent is not greater than 20 wt % of the porous separator film.

The method for fabricating the super fine fibrous porous polymer separator film of the present invention comprises the steps of melting a polymer or dissolving a polymer in an organic solvent and fabricating a porous polymer separator film.

The step of melting a polymer or dissolving a polymer is achieved by melting the polymer by heat or mixing the polymer with a certain organic solvent and raising the temperature of the mixture to obtain a clear polymeric solution.

If a polymer is dissolved in an organic solvent, the organic solvent is not limited, on condition that it can dissolve polymers substantially and be applied to electrospinning. Solvents which might influence on the characteristics of battery can even be used because the organic solvents are removed while fabricating the porous polymer separator film by electrospinning. Examples of the organic solvent include propylene carbonate, butylene carbonate, 1,4-butyrolactone, diethyl carbonate, dimethyl carbonate, 1,2-dimethoxyethane, 11,3-dimethyl-2-imidazoldinone, dimethylsulfoxide, ethylene carbonate, ethymethyl carbonate, N,N-dimethylformamide, N,N-dimethylacetamide, N-methyl-2-pyrrolidone, polyethylenesulforane, tetra-ethylene glycol dimethyl ether, acetone, alcohol or mixtures thereof.

The fabrication of the porous polymer separator film of the present invention is generally achieved by electrospinning. In more detail, a porous polymer separator film can be fabricated by filling a polymeric melt or polymeric solution dissolved in an organic solvent into a barrel of an electrospinning apparatus, applying a high voltage to a nozzle, and discharging the polymeric melt or polymeric solution onto a metal substrate or a Mylar film through the nozzle at a constant rate. The thickness of the porous polymer separator film can be optionally adjusted by varying the discharging rate and time. As mentioned before, the preferable thickness range is within 1-100 μm.

If the above-described method is used, a polymer separator film built up three-dimensionally with fibers having a diameter of 1~3000 nm, not just the polymer fibers forming a separator film, can be fabricated directly. If it is necessary, a highly porous separator film can be prepared onto electrodes directly. Accordingly, although the above-mentioned method is a fabrication in fibrous form, no additional apparatus is required and an economical efficiency can be achieved by simplifying the fabrication process because final product can be fabricated not just as fibers but as a film directly.

A porous polymer separator film using two or more polymers can be obtained by the following two fabrication methods: 1) After two or more polymers are melted or dissolved in one or more organic solvents, the polymeric melts or solutions are filled into a barrel of an electrospinning apparatus, and then discharged using a nozzle to fabricate a separator film in a state that polymer fibers are entangled with each other; and 2) After two or more polymers are melted separately or dissolved in organic solvents respectively, the polymeric melts or solutions are filled into different barrels of an electrospinning apparatus respectively, and then discharged the polymeric melts or solutions using nozzles to fabricate separator films in a state that the polymer fibers are entangled with each other respectively.

Figure 2A:
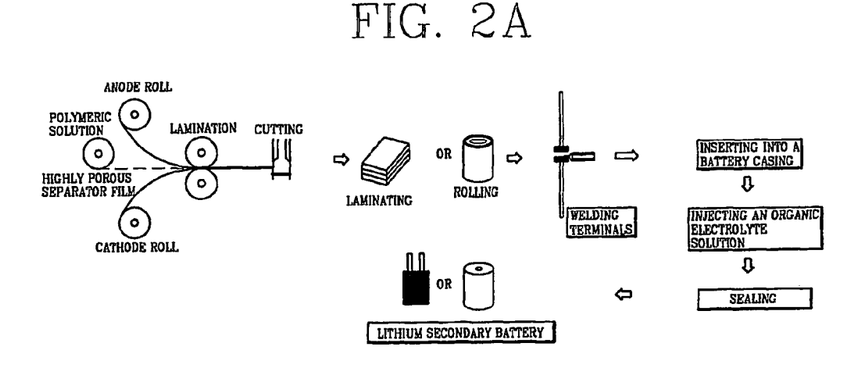
FIGS. 2a-2c are process flow diagrams illustrating fabrication processes of lithium secondary batteries according to the present invention.
Figure 2B:
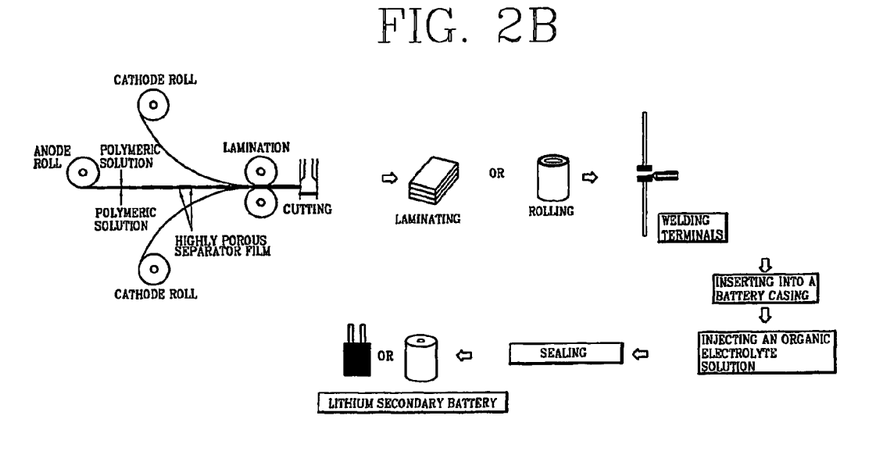
Figure 2C:
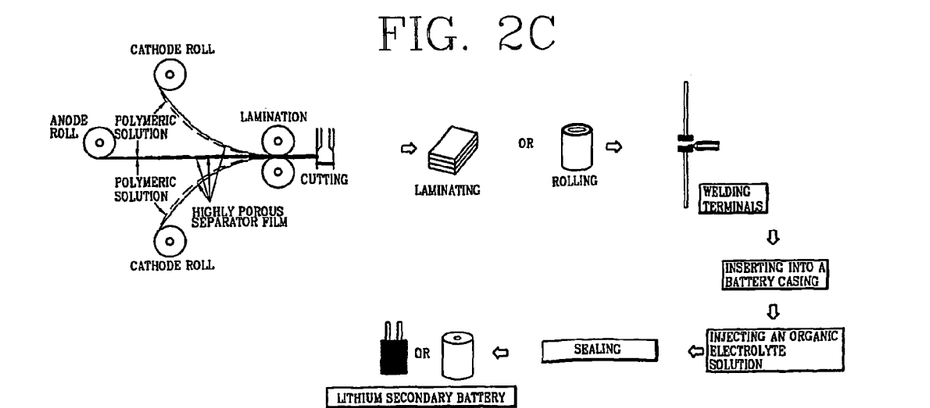

The present invention also relates to a fabrication method of a lithium secondary battery, and FIG. 2 illustrates the fabrication processes of lithium secondary batteries of the present invention in detail. FIG. 2a illustrates a fabrication process of a battery comprising, inserting a porous polymer separator film fabricated by electrospinning between a cathode and an anode, making the electrolytes and the electrodes into one body by a certain heat lamination process, inserting the resulting plate into a battery casing after laminating or rolling it, injecting an organic electrolyte solution into the battery casing, and then finally sealing the casing. FIG. 2b illustrates a fabrication process of a battery comprising, coating a porous polymer separator film on both sides of a cathode or an anode, adhering the electrode having different magnetic pole from the coated one onto a porous polymer separator film, making the electrolytes and electrodes into one body by a heat lamination process, inserting the resulting plate into a battery casing after laminating or rolling it, injecting an organic electrolyte solution into the battery casing, and then finally sealing the battery casing. FIG. 2c illustrates a fabrication process of a battery comprising, coating a porous polymer separator film on both sides of one of two electrodes and on one side of the other electrode, adhering the electrodes closely so as to face the polymer separator films to each other, making the electrolytes and electrodes into one body by a certain heat lamination process, inserting the resulting plate into a battery casing after laminating or rolling it, injecting an organic electrolyte solution into the battery casing, and sealing the battery casing.

The anode and cathode used in the lithium secondary battery of the present invention are prepared by mixing a certain amount of an active material, a conducting material, a bonding agent and an organic solvent, casting the resulting mixture on both sides of a copper or aluminum foil plate grid, and then dry-compressing the plate. In more detail, the anode active material comprises one or more materials selected from the group consisting of graphite, cokes, hard carbon, tin oxide, lithiumized compounds thereof, metallic lithium and lithium alloy. The cathode active material comprises one or more materials selected from the group consisting of $LiClO_2$, $LiNiO_2$, $LiNiCoO_2$, $LiMn_2O_4$, $V_2O_5$, and $V_6O_{13}$.

EXAMPLES

The present invention will be described in more detail by way of the following examples, but those examples are given for the purpose to illustrate the present invention, not to limit the scope of it.

Example 1

1-1) Fabrication of a Porous Polymer Separator Film 20 g of polyvinylidenefluoride (Kynar 761) was added to 100 g of dimethylacetamide, and the resulting mixture was stirred at room temperature for 24 hours to give a clear polymeric solution. The resulting polymeric solution was filled into a barrel of an electrospinning apparatus and discharged onto a metal plate at a constant rate using a nozzle charged with 9 kV to fabricate a porous polymer separator film having a thickness of 50 μm.

1-2) Fabrication of a Lithium Secondary Battery

The porous polymer separator film fabricated in Example 1-1 was inserted between a graphite anode and a $LiCoO_2$ cathode, the resulting plates were cut so as to be 3 cm×4 cm in size and laminated. Terminals were welded on the electrodes and the laminated plate was inserted into a vacuum casing. A 1M $LiPF_6$ solution in EC-DMC was injected into the vacuum casing, and then finally the vacuum casing was vacuum-sealed to fabricate a lithium secondary battery.

Example 2

2-1) 20 g of polyvinylidenefluoride (Kynar 761) was added to 10 g of dimethylacetamide, and the resulting mixture was stirred at room temperature for 24 hours to give a clear polymeric solution. The resulting polymeric solution was filled into the barrel of an electrospinning apparatus and discharged onto both sides of a graphite anode at a constant rate using a nozzle charged with 9 kV to fabricate a graphite anode coated with a porous polymer separator film having a thickness of 50 μm.

2-2) A $LiCoO_2$ cathode was adhered onto the porous polymer separator film obtained in Example 2-1. The resulting plate was cut so as to be 3 cm×4 cm in size and laminated. Terminals were welded on the electrodes and the laminated plate was inserted into a vacuum casing. A 1M $LiPF_6$ solution in EC-DMC was injected into the vacuum casing, and the casing was then finally vacuum-sealed to fabricate a lithium secondary battery.

Example 3

3-1) 20 g of polyvinylidenefluoride (Kynar 761) was added to 100 g of dimethylacetamide, and the mixture was stirred at room temperature for 24 hours to give a clear polymeric solution. The resulting polymeric solution was filled into the barrel of an electrospinning apparatus and discharged onto one side of a $LiCoO_2$ cathode at a constant rate using a nozzle charged with 9 kV to fabricate a $LiCoO_2$ cathode coated with a porous polymer separator film having a thickness of 50 μm.

3-2) The $LiCoO_2$ cathode obtained in Example 3-1 was adhered onto both sides of the graphite anode obtained in Example 2-1 so as to face the porous polymer separator films to each other. The resulting plate was made into one body by heat lamination at 110° C., followed by cutting so as to be 3 cm×4 cm in size and then laminated. Terminals were welded on the electrodes and then the laminated plate was inserted into a vacuum casing. A 1M $LiPF_6$ solution in EC-DMC was injected into the casing, and the casing was then finally vacuum-sealed to fabricate a lithium secondary battery.

Example 4

4-1) 10 g of polyvinylidenefluoride (Kynar 761) and 10 g of PAN (prepared by Polyscience Company, molecular weight of about 150,000) were added to 100 g of dimethylacetamide, and the resulting mixture was stirred at room temperature for 24 hours to give a clear polymeric solution. The resulting polymeric solution was filled into the barrel of an electrospinning apparatus and discharged onto both sides of a graphite anode using a nozzle charged with 9 kV at a constant rate to fabricate a graphite anode coated with a porous polymer separator film of 50 µm thick.

4-2) The process in Example 4-1 was applied to one side of a $LiCoO_2$ cathode instead of to both sides of a graphite anode, to fabricate a $LiCoO_2$ cathode coated with a porous polymer separator film on one side of it.

4-3) The $LiCoO_2$ cathode obtained in Example 4-2 was adhered onto both sides of the graphite anode obtained in Example 4-1 so as to face porous polymer separator films to each other. The resulting plate was made into one body by heat lamination at 110° C., followed by cutting so as to be 3 cm×4 cm in size and then laminated. Terminals were welded on the electrodes and then the laminated plate was inserted into a vacuum casing. A 1M $LiPF_6$ solution in EC-DMC was injected into the casing, and the casing was then finally vacuum-sealed to fabricate a lithium secondary battery.

Example 5

5-1) Two polymeric solutions of 20 g of polyvinylidenefluoride (Kynar 761) in 100 g of dimethylacetamide and 20 g of PAN (prepared by Polyscience Company, molecular weight of about 150,000) in 100 g of dimethylacetamide were respectively filled into separate barrels of an electrospinning apparatus. Then the solutions were discharged onto both sides of a graphite anode using nozzles charged with 9 kV respectively at a constant rate to fabricate a graphite anode coated with a porous polymer separator film having a thickness of 50 µm.

5-2) A $LiCoO_2$ cathode was adhered onto the porous polymer separator film obtained in Example 5-1. The resulting plate was cut so as to be 3 cm×4 cm in size and then laminated. Terminals were welded on the electrodes and then the laminated plate was inserted into a vacuum casing. A 1M $LiPF_6$ solution in EC-DMC was injected into the casing, and the casing was then finally vacuum-sealed to give a lithium secondary battery.

Example 6

6-1) Two polymeric solutions of 20 g of polyvinylidenefluoride (Kynar 761) in 100 g of dimethylacetamide and 20 g of PAN (prepared by Polyscience Company, molecular weight of about 150,000) in 100 g of dimethylacetamide were respectively filled into separate barrels of an electrospinning apparatus. Then the solutions were discharged onto both sides of a graphite anode using nozzles charged with 9 kV respectively at a constant rate to fabricate a graphite anode coated with a porous polymer separator film having a thickness of 50 µm.

6-2) The process of Example 6-1 was applied to one side of a $LiCoO_2$ cathode instead of to both sides of a graphite anode to fabricate a $LiCoO_2$ cathode coated with a porous polymer separator film on one side of it.

6-3) The $LiCoO_2$ cathode obtained in Example 6-2 was adhered onto both sides of the graphite anode obtained in Example 6-1 so as to face porous polymer separator films to each other. The resulting plate was made into one body by heat lamination at 110° C., followed by cutting so as to be 3 cm×4 cm in size and then laminated. Terminals were welded on the electrodes and then the laminated plate was inserted into a vacuum casing. A 1M $LiPF_6$ solution in EC-DMC was injected into the casing, and the casing was then finally vacuum-sealed to fabricate a lithium secondary battery.

Example 7

7-1) A polymeric solution of 10 g of polyvinylidenefluoride (Kynar 761), 5g of PAN (prepared by Polyscience Company and having a molecular weight of about 150,000) and 5 g of PMMA (prepared by Polyscience Company and having a molecular weight of 100,000) in 100 g of demethylacetamide was filled into the barrel of an electrospinning apparatus, and discharged onto both sides of a graphite anode using a nozzle charged with 9 kV at a constant rate to fabricate a graphite anode coated with a porous polymer separator film having a thickness of 50 µm.

7-2) A $LiCoO_2$ cathode was adhered onto the porous polymer separator film obtained in Example 7-1. The resulting plate was cut so as to be 3 cm×4 cm in size and then laminated. Terminals were welded on the electrodes and then the laminated plate was inserted into a vacuum casing. A 1M $LiPF_6$ solution in EC-DMC was injected into the casing, and the casing was then finally vacuum-sealed to give a lithium secondary battery.

Example 8

8-1) A polymeric solution of 10 g of polyvinylidenefluoride (Kynar 761), 5g of PAN (prepared by Polyscience Company and having molecular weight of about 150,000) and 5 g of PMMA (prepared by Polyscience Company and having molecular weight of 100,000) in 100 g of dimethylacetamide was filled into the barrel of electrospinning apparatus, and discharged onto both sides of a graphite anode using a nozzle charged with 9 kV at a constant rate to fabricate a graphite anode coated with a porous polymer separator film having a thickness of 50 µm.

8-2) The process of Example 8-1 was applied to one side of $LiCoO_2$ cathode instead of to both sides of a graphite anode to fabricate $LiCoO_2$ cathode coated with a porous polymer separator film on one side of it.

8-3) The $LiCoO_2$ cathode obtained in Example 8-2 was adhered onto both sides of the graphite anode obtained in Example 8-1 so as to face porous polymer separator films to each other. The resulting plate was made into one body by heat lamination at 110° C., followed by cutting so as to be 3 cm×4 cm in size and then laminated. Terminals were welded on the electrodes and then the laminated plate was inserted into a vacuum casing. A 1M $LiPF_6$ solution in EC-DMC was injected into the casing, and the casing was then finally vacuum-sealed to fabricate a lithium secondary battery.

COMPARATIVE EXAMPLES

Comparative Example 1

A lithium secondary battery was fabricated by laminating electrodes and separator films in order of anode, PE separator film, cathode, PE separator film and anode, inserting the resulting laminated plate into a vacuum casing, injecting a 1M $LiPF_6$ solution in EC-DMC into the casing, and then finally vacuum-sealing the casing.

Comparative Example 2

According to the conventional preparation method of a gel-polymer electrolyte, 9 g of 1M $LiPF_6$ solution in EC-DMC was added to 3 g of PAN, and the resulting mixture was mixed for 12 hours. After mixing, the resulting mixture was heated at 130° C. for 1 hour to give a clear polymeric solution. When a viscosity of 10,000 cps suitable for casting was obtained, the polymeric solution was cast by die-casting to give a polymer electrolyte film. A lithium secondary battery was fabricated by laminating, in order, a graphite anode, an electrolyte, a $LiCoO_2$ cathode, an electrolyte and a graphite anode, welding terminals on the electrodes, inserting the resulting laminated plate into a vacuum casing, injecting a 1M $LiPF_6$ solution in EC-DMC into the casing, and then finally vacuum-sealing the casing.

Example 9

Figure 3:
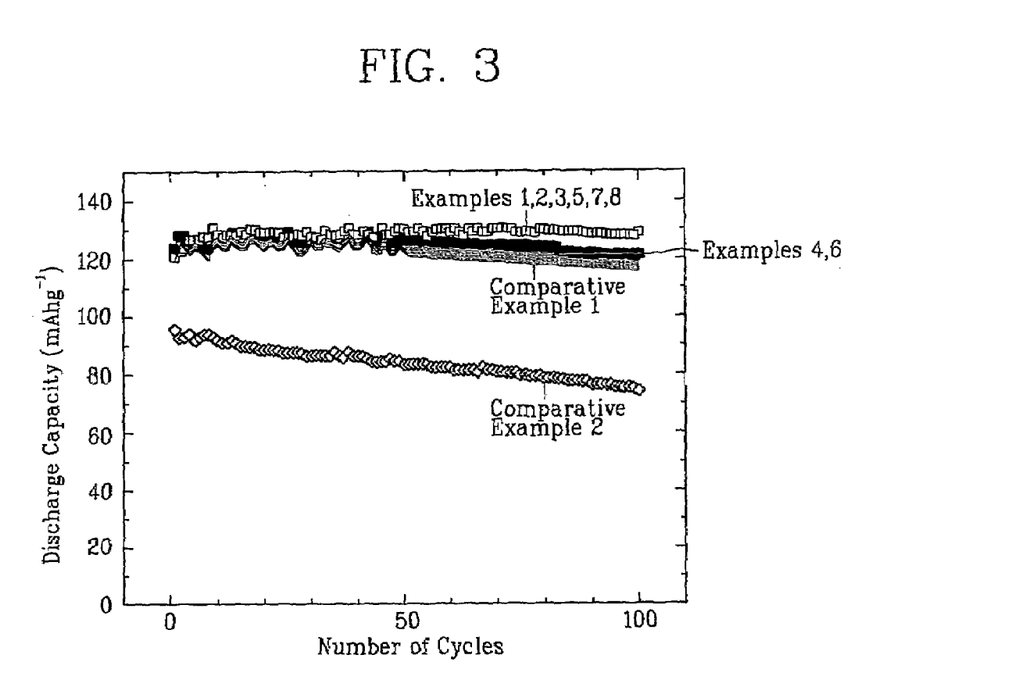
FIG. 3 is a graph showing charge and discharge characteristics of the lithium secondary batteries of Examples 1-8 and Comparative Examples 1 and 2.

Charge/discharge characteristics of the lithium secondary batteries obtained in Examples 1-8 and Comparative Examples 1 and 2 were tested and FIG. 3 shows the results. The tests for obtaining the charge/discharge characteristics were performed by a charge/discharge method of, after charging the batteries with a C/2 constant current and 4.2V constant voltage, discharging with a C/2 constant current, and the electrode capacities and cycle life based on the cathode were tested. FIG. 3 shows that the electrode capacities and cycle life of the lithium secondary batteries of Examples 1-8 were improved compared to the lithium secondary batteries of Comparative Examples 1 and 2. It is considered that such improvement in the battery characteristics came from a decrease in interface resistance and an increase in ionic conductivity due to good adherence of the electrodes and separator film.

Example 10

Figure 4A:
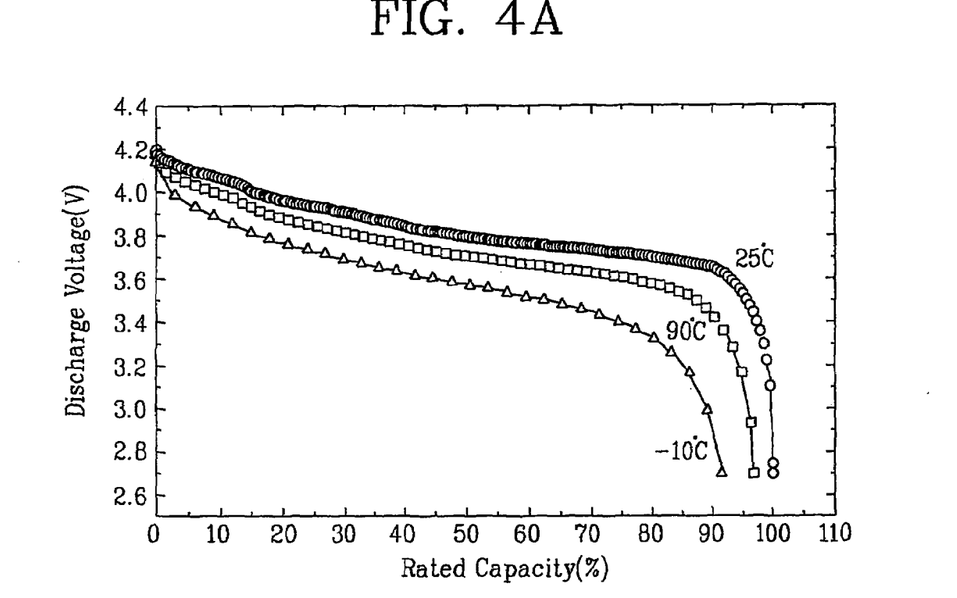
FIG. 4 is a graph showing low- and high-temperature characteristics of the lithium secondary batteries of Example 5 and Comparative Example 2.
Figure 4B:
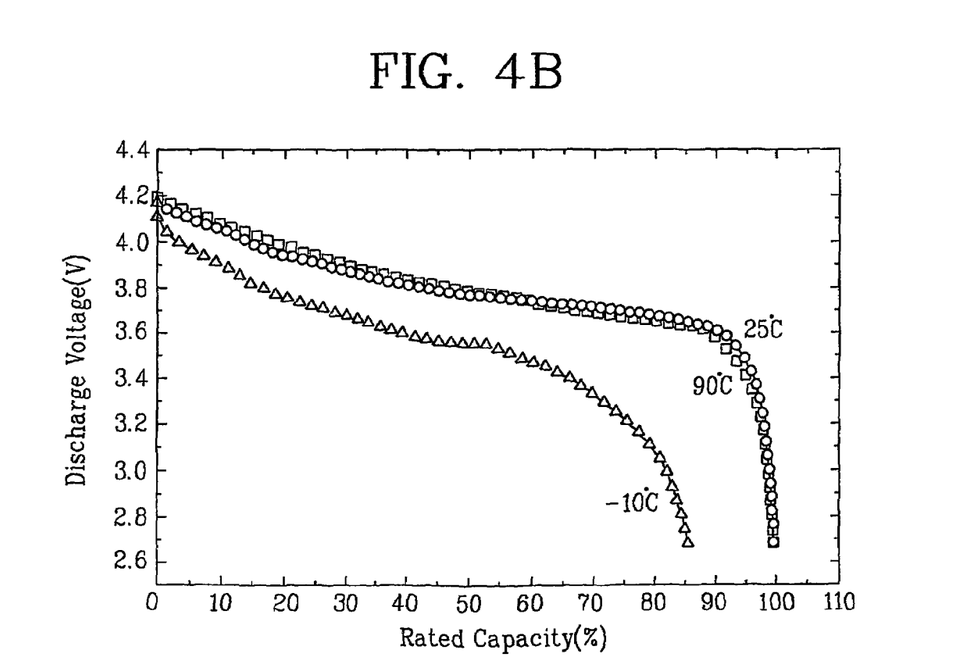

Low- and high-temperature characteristics of the lithium secondary batteries of Example 5 and Comparative Example 2 were tested and FIGS. 4a and 4b illustrate the results (wherein FIG. 4a is of Example 5 and FIG. 4b is of Comparative Example 2). The tests for obtaining the low- and high-temperature characteristics of the lithium secondary batteries were performed by a charge/discharge method of charging the lithium batteries with a C/2 constant current and 4.2 V constant voltage, and then discharging with a C/5 constant current. FIGS. 4a and 4b show that the low- and high-temperature characteristics of the lithium secondary battery of Example 5 are better than those of the battery of Comparative Example 2. In particular, it shows that the battery of Example 2 has an outstanding characteristic of 91% even at −10° C.

Example 11

Figure 5A:
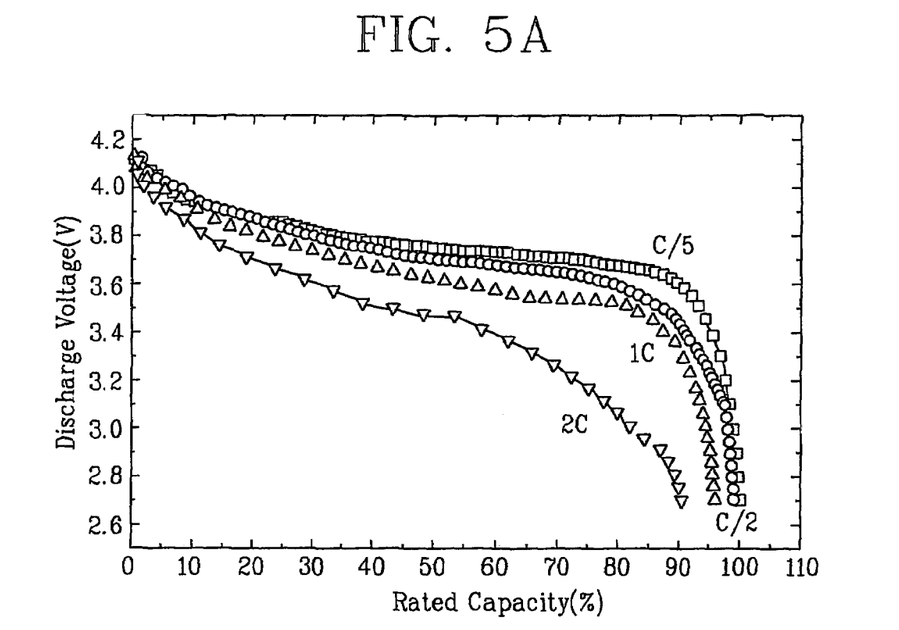
FIG. 5 is a graph showing high-rate discharge characteristics of the lithium secondary batteries of Example 3 and Comparative Example 2.
Figure 5B:
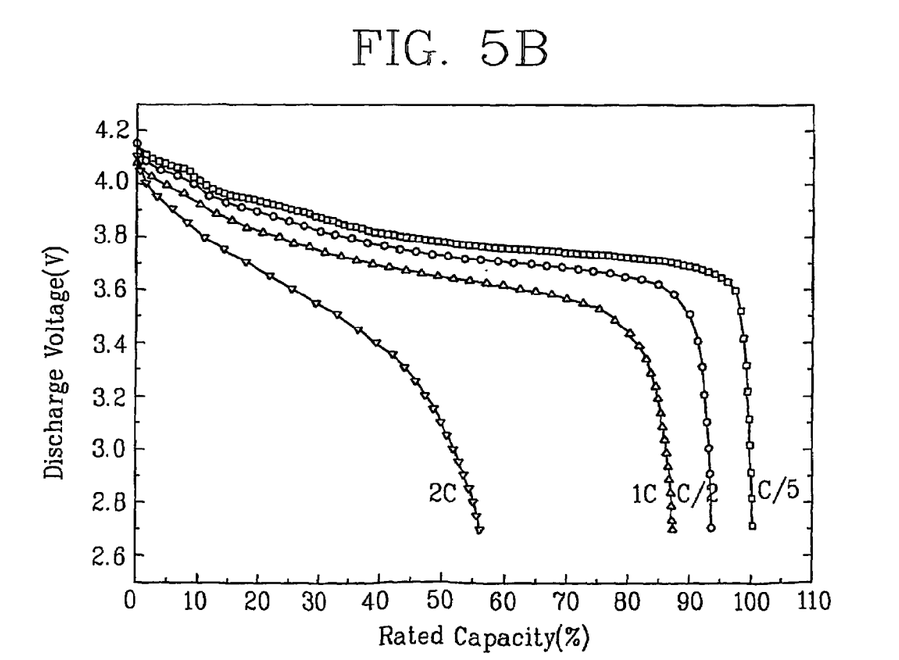

High rate discharge characteristics of the lithium secondary batteries of Example 3 and Comparative Example 2 were tested and FIGS. 5a and 5b illustrate the results (wherein FIG. 5a is of Example 3 and FIG. 5b is of Comparative Example 2). The tests for obtaining the high rate discharge characteristics of the lithium secondary batteries were performed by a charge/discharge method of charging the lithium batteries with a C/2 constant current and 4.2 V constant voltage, and then discharging while varying the constant current to C/5, C/2, 1 C and 2 C. As depicted in FIGS. 5a and 5b, the lithium secondary battery of Example 3 exhibited capacities such as 99% at C/2 discharge, 96% at 1 C discharge and 90% at 2 C discharge based on the value of C/5 discharge. However, the lithium secondary battery of Comparative Example 2 exhibited low capacities such as 87% at 1 C discharge and 56% at 2 C discharge based on the value of C/5 discharge. Accordingly, it was discovered that the high rate discharge characteristic of the lithium secondary battery of Example 3 was better than that of the lithium secondary battery of Comparative Example 2.

The invention claimed is:

1. A lithium secondary battery comprising a cathode active material, an anode active material, a porous polymer separator film and an organic electrolyte solution dissolving a lithium salt, wherein the porous polymer separator film is an electrospun porous polymer separator film and is constructed with super fine fibrous polymer having a diameter of 1-3000 nm,
   wherein the porous polymer separator film is fabricated by
   melting a polymer or polymer mixture or dissolving a polymer or polymer mixture in a certain organic solvent in order to obtain a polymeric melt or polymeric solution;
   filling the polymeric melt or polymeric solution into a barrel of an electrospinning apparatus; and
   discharging the polymeric melt or polymeric solution using a nozzle.

2. A lithium secondary battery comprising a cathode active material, an anode active material, a porous polymer separator film and an organic electrolyte solution dissolving a lithium salt, wherein the porous polymer separator film is an electrospun porous polymer separator film and is constructed with super fine fibrous polymer having a diameter of 1-3000 nm,
   wherein the porous polymer separator film is fabricated by
   melting two or more polymers respectively or dissolving two or more polymers in an organic solvent respectively in order to obtain two or more respective polymeric melts or polymeric solutions,
   filling the respective polymeric melts or polymeric solutions to different barrels of an electrospinning apparatus; and
   discharging the respective polymeric melts or polymeric solutions using different nozzles.

3. The lithium secondary battery according to claim 1 or 2, wherein the organic solvent dissolving the polymer is selected from the group consisting of propylene carbonate, butylene carbonate, 1,4-butyrolactone, diethyl carbonate, dimethyl carbonate, 1,2-dimethoxyethane, 1,3-dimethyl-2-imidazolidinone, dimethylsulfoxide, ethylene carbonate, ethylmethyl carbonate, N,N-dimethylformamide, N,N-dimethylacetamide, N-methyl-2-pyrrolidone, polyethylenesulforane, tetraethylene glycol dimethyl ether, acetone, alcohol and mixtures thereof.

4. A lithium secondary battery comprising a cathode active material, an anode active material, a porous polymer separator film and an organic electrolyte solution dissolving a lithium salt, wherein the porous polymer separator film is an electrospun porous polymer separator film and is constructed with super fine fibrous polymer having a diameter of 1-3000 nm; wherein the organic solvent used in the organic electrolyte solution comprises ethylene carbonate, propylene carbonate diethyl carbonate, dimethyl carbonate, ethylmethyl carbonate or mixtures thereof, wherein the organic solvent further comprises methyl acetate, methyl propionate, ethyl acetate, ethyl propionate, butylene carbonate, γ-butyrolactone, 1,2-dimethoxyethane, 1,2-dimethoxyethane, dimethylacetamide, tetrahydrofuran or mixtures thereof in order to improve a low-temperature characteristic.

5. A lithium secondary battery comprising a cathode active material, an anode active material, a porous polymer separator film and an organic electrolyte solution dissolving a lithium salt, wherein the porous polymer separator film is an electrospun porous polymer separator film and is constructed with super fine fibrous polymer having a diameter of 1-3000 nm, wherein the porous polymer separator film further comprises a filling agent selected from the group consisting of $TiO_2$, BaTiO3, $Li_2O$, LiF, LiOH, $Li_3N$, BaO, $Na_2O$, MgO, $Li_2CO_3$, $LiAlO_2$, $SiO_2$, $Al_2O_3$, PTFE and mixtures thereof, and a content of the filling agent is greater than 0 wt % and less than 20 wt % of the porous polymer separator film.

6. A method for fabricating a lithium secondary battery comprising a cathode active material, an anode active material, a porous polymer separator film and an organic electrolyte solution dissolving a lithium salt, wherein the porous polymer separator film is an electrospun porous polymer separator film and is constructed with super fine fibrous polymer having a diameter of 1-3000 nm; the method comprising:
 inserting a porous polymer separator film having a super fine fibrous polymer having a diameter of 1-3000 nm fabricated by an electrospinning between a cathode and an anode;
 inserting the resulting plates into a battery casing after laminating or rolling them;
 injecting an organic electrolyte solution into the battery casing; and
 sealing the battery casing.

7. A method for fabricating a lithium secondary battery comprising a cathode active material, an anode active material, a porous polymer separator film and an organic electrolyte solution dissolving a lithium salt, wherein the porous polymer separator film is an electrospun porous polymer separator film and is constructed with super fine fibrous polymer having a diameter of 1-3000 nm; the method comprising: inserting a porous polymer separator film having a super fine fibrous polymer having a diameter of 1-3000 nm fabricated by an electrospinning between a cathode and an anode;
 making the electrolytes and electrodes into one body by a heat lamination process;
 inserting the resulting plate into a battery casing after laminating or rolling it;
 injecting an organic electrolyte solution into the battery casing; and
 sealing the battery casing.

8. A method for fabricating a lithium secondary battery comprising a cathode active material, an anode active material, a porous polymer separator film and an organic electrolyte solution dissolving a lithium salt, wherein the porous polymer separator film is an electrospun porous polymer separator film and is constructed with super fine fibrous polymer having a diameter of 1-3000 nm; the method comprising:
 coating a porous polymer separator film having a super fine fibrous polymer having a diameter of 1-3000 nm fabricated by an electrospinning on both sides of a cathode or an anode;
 adhering the electrode having different magnetic pole from the coated one closely onto the electrolytes;
 inserting the resulting plate into a battery casing after laminating or rolling it;
 injecting an organic electrolyte solution into the battery casing; and
 sealing the battery casing.

9. A method for fabricating a lithium secondary battery comprising a cathode active material, an anode active material, a porous polymer separator film and an organic electrolyte solution dissolving a lithium salt, wherein the porous polymer separator film is an electrospun porous polymer separator film and is constructed with super fine fibrous polymer having a diameter of 1-3000 nm, the method comprising:
 coating a porous polymer separator film having a super fine fibrous polymer having a diameter of 1-3000 nm fabricated by an electrospinning on both sides of a cathode or an anode;
 adhering the electrode having different magnetic pole from the coated one closely onto the electrolytes;
 making the electrolytes and electrodes into one body by a heat lamination process;
 inserting the resulting plate into a battery casing after laminating or rolling it;
 injecting an organic electrolyte solution into the battery casing; and
 sealing the battery casing.

10. A method for fabricating a lithium secondary battery comprising a cathode active material, an anode active material, a porous polymer separator film and an organic electrolyte solution dissolving a lithium salt, wherein the porous polymer separator film is an electrospun porous polymer separator film and is constructed with super fine fibrous polymer having a diameter of 1-3000 nm, the method comprising:
 coating a porous polymer separator film having a super fine fibrous polymer having a diameter of 1-3000 nm fabricated by an electrospinning on both sides of one of two electrodes and on one side of the other electrode;
 adhering the electrodes closely so as to face the electrolytes to each other;
 inserting the resulting plate into a battery casing after laminating or rolling it;
 injecting an organic electrolyte solution into the battery casing; and
 sealing the battery casing.

11. A method for fabricating a lithium secondary battery comprising a cathode active material, an anode active material, a porous polymer separator film and an organic electrolyte solution dissolving a lithium salt, wherein the porous polymer separator film is an electrospun porous polymer separator film and is constructed with super fine fibrous polymer having a diameter of 1-3000 nm; the method comprising:

coating a porous polymer separator film having a super fine fibrous polymer having a diameter of 1-3000 nm fabricated by an electrospinning on both sides of one of two electrodes and on one side of the other electrode;

adhering the resulting plate closely so as to face the electrolytes to each other;

making the electrolytes and electrodes into one body by a heat lamination process;

inserting the resulting plate into a battery casing after laminating or rolling it;

injecting an organic electrolyte solution into the battery casing; and sealing the battery casing.

* * * * *